US012787978B1

(12) United States Patent
Blake

(10) Patent No.: US 12,787,978 B1
(45) Date of Patent: Nov. 10, 2026

(54) ANIMAL TRAINING TABLE

(71) Applicant: PAW Acquisition I Corp., Aurora, CO (US)

(72) Inventor: David R. Blake, Maquoketa, IA (US)

(73) Assignee: PAW ACQUISITION I CORP., Aurora, CO (US)

( * ) Notice: Subject to any disclaimer, the term of this patent is extended or adjusted under 35 U.S.C. 154(b) by 0 days.

(21) Appl. No.: 19/290,985

(22) Filed: Aug. 5, 2025

(51) Int. Cl.
*A01K 15/02* (2006.01)
*A47B 7/02* (2006.01)

(52) U.S. Cl.
CPC ................ *A01K 15/02* (2013.01); *A47B 7/02* (2013.01)

(58) Field of Classification Search
CPC .................................. A47B 7/02; A01K 15/02
USPC ........................................................... 108/64
See application file for complete search history.

(56) References Cited

U.S. PATENT DOCUMENTS

| | | | | |
|---|---|---|---|---|
| 67,039 | A | 7/1867 | Golding | |
| 2,986,751 | A | 6/1961 | Baren | |
| 3,650,224 | A * | 3/1972 | Petix | B65D 21/0204 108/56.1 |
| 3,687,092 | A | 8/1972 | Manning | |
| 3,781,931 | A | 1/1974 | Knickerbocker | |
| 4,011,821 | A | 3/1977 | Neal | |
| D275,302 | S | 8/1984 | Rotella | |
| 4,968,278 | A | 11/1990 | Lemke et al. | |
| 5,066,000 | A | 11/1991 | Dolan | |
| 5,076,534 | A | 12/1991 | Adam | |
| 5,101,752 | A | 4/1992 | Smollar et al. | |
| D337,362 | S | 7/1993 | Goldstein et al. | |
| D339,179 | S | 9/1993 | Wilkinson | |
| 5,269,231 | A | 12/1993 | Johnson | |
| 5,290,210 | A | 3/1994 | Hand et al. | |
| D353,636 | S | 12/1994 | Le Roux | |
| 5,400,719 | A | 3/1995 | Santapa et al. | |
| 5,441,466 | A | 8/1995 | Piaget et al. | |
| D366,190 | S | 1/1996 | Vance et al. | |
| 5,507,674 | A | 4/1996 | Yeung | |
| 5,556,181 | A | 9/1996 | Bertrand | |
| 5,853,309 | A | 12/1998 | Biggs | |

(Continued)

FOREIGN PATENT DOCUMENTS

| | | |
|---|---|---|
| GB | 2568472 | 5/2019 |
| WO | WO 2004/078269 | 9/2004 |

OTHER PUBLICATIONS

Dog Agility USA Adjustable Gripper Top Pause Table 35"x35", downloaded from www.dogagilityusa.com/Pause_Tables-Adjustable_Gripper_Top_Pause_Table_35x35.html Apr. 8, 2014.

(Continued)

*Primary Examiner* — Daniel J Troy
*Assistant Examiner* — Timothy M Ayres
(74) *Attorney, Agent, or Firm* — Sheridan Ross P.C.

(57) ABSTRACT

A table for training an animal. The table can include legs and a top surface that are formed as a unitary part. The table is adapted to interlock with one or more like tables on the lateral sides of the table. The table is further adapted to stack onto like tables and to support a like table. The table includes projections and defines recesses on the lateral sides. A projection can selectively interlock with a recess on a like table to laterally couple the tables. The table further can define depressions on a top side to receive feet on a like table.

20 Claims, 9 Drawing Sheets

(56) References Cited

U.S. PATENT DOCUMENTS

| | | | |
|---|---|---|---|
| 5,860,369 A | 1/1999 | John et al. | |
| 5,876,262 A | 3/1999 | Kelly et al. | |
| 6,053,790 A | 4/2000 | Langford | |
| 6,171,160 B1 | 1/2001 | Skaggs et al. | |
| 6,234,087 B1 | 5/2001 | Brown | |
| 6,253,688 B1 | 7/2001 | Lor | |
| 6,282,084 B1 | 8/2001 | Goerdt et al. | |
| 6,662,732 B2 | 12/2003 | Birsel et al. | |
| 6,976,434 B2 | 12/2005 | Roig et al. | |
| D522,284 S | 6/2006 | Shapiro et al. | |
| 7,331,074 B2 | 2/2008 | Wu | |
| 7,334,529 B1 * | 2/2008 | Liao | B65D 19/0018 108/57.26 |
| 7,462,142 B1 | 12/2008 | Gordon | |
| 7,793,618 B2 | 9/2010 | Edwards et al. | |
| 8,052,587 B1 | 11/2011 | Wu | |
| 8,096,008 B1 | 1/2012 | Phillips | |
| 8,118,375 B2 | 2/2012 | Berthiaume et al. | |
| 8,146,517 B1 | 4/2012 | Masser et al. | |
| 8,176,857 B2 | 5/2012 | Ochs | |
| 8,215,245 B2 | 7/2012 | Morrison et al. | |
| D665,594 S | 8/2012 | Goldszer | |
| 8,286,452 B2 * | 10/2012 | Kendall | D06F 43/00 68/3 R |
| 8,316,781 B1 | 11/2012 | Majors | |
| 8,327,775 B2 | 12/2012 | Fox Harris | |
| 8,360,943 B2 | 1/2013 | Smith | |
| D680,599 S | 4/2013 | Orenstein et al. | |
| D681,138 S | 4/2013 | Hodgkins | |
| 8,657,130 B2 * | 2/2014 | Thrush | A47F 5/0892 211/175 |
| 8,919,263 B2 | 12/2014 | Jeong | |
| D740,500 S | 10/2015 | Wickens | |
| D746,934 S | 1/2016 | Hsu | |
| D747,425 S | 1/2016 | Hsu | |
| 9,241,580 B2 | 1/2016 | Patrick et al. | |
| 9,282,819 B2 | 3/2016 | Blake | |
| 9,376,777 B2 | 6/2016 | Peterson | |
| 9,724,586 B2 | 8/2017 | Smith et al. | |
| D800,973 S | 10/2017 | Jakubowski | |
| D804,590 S | 12/2017 | Hillson | |
| D824,114 S | 7/2018 | Couse et al. | |
| D824,115 S | 7/2018 | Couse et al. | |
| D824,116 S | 7/2018 | Couse et al. | |
| D824,117 S | 7/2018 | Couse et al. | |
| D834,768 S | 11/2018 | Sarver | |
| D861,994 S | 10/2019 | MacNeil et al. | |
| D864,493 S | 10/2019 | MacNeil et al. | |
| D894,504 S | 8/2020 | Ryan | |
| D930,285 S | 9/2021 | Sarver | |
| 11,266,551 B2 | 3/2022 | Davis | |
| 11,427,379 B2 * | 8/2022 | Fitzgerald | B65D 19/004 |
| D968,729 S | 11/2022 | Chen | |
| D969,242 S | 11/2022 | Ehrenreich | |
| D978,446 S | 2/2023 | Wendling | |
| D985,216 S | 5/2023 | Blake | |
| D985,217 S | 5/2023 | Blake | |
| D986,517 S | 5/2023 | Blake | |
| 12,082,556 B2 * | 9/2024 | Blake | A01K 15/027 |
| 12,274,235 B1 * | 4/2025 | Zheng | A01K 1/0157 |
| 2005/0049123 A1 | 3/2005 | Dalebout et al. | |
| 2005/0081299 A1 | 4/2005 | Torres | |
| 2005/0170935 A1 | 8/2005 | Manser | |
| 2012/0031311 A1 | 2/2012 | Jong | |
| 2012/0202652 A1 | 8/2012 | Ross | |
| 2012/0208678 A1 | 8/2012 | Knilans | |
| 2012/0271350 A1 | 10/2012 | Palmer | |
| 2014/0302973 A1 | 10/2014 | Fitterer | |
| 2016/0272285 A1 | 9/2016 | Ackerman et al. | |
| 2017/0043199 A1 | 2/2017 | Lin | |
| 2018/0064252 A1 | 3/2018 | Chin | |
| 2019/0045747 A1 | 2/2019 | Torraca et al. | |

OTHER PUBLICATIONS

U.S. Appl. No. 30/016,647, filed Aug. 5, 2025, Blake.
"Blue-9 Propel Air Platform Kit, Professionally Designed Dog Training Accessories and Pet Products, Made in The USA, Gray," Blue-9 Store via Amazon.com, first available Oct. 1, 2021, retrieved Apr. 1, 2026 from https://www.amazon.com/Blue-9-Conditioning-Equipment-Accessories-Professionally/dp/B09HR33YFZ?th=1, 6 pages.
Official Action for U.S. Appl. No. 14/335,440, dated Apr. 20, 2015, 8 pages.
Official Action for U.S. Appl. No. 14/335,440, dated Sep. 18, 2015, 6 pages.
Notice of Allowance for U.S. Appl. No. 14/335,440, dated Dec. 24, 2015, 7 pages.
Supplemental Notice of Allowance for U.S. Appl. No. 14/335,440, dated Feb. 4, 2016, 2 pages.
Notice of Allowance for U.S. Appl. No. 29/770,936, dated Mar. 15, 2023, 7 pages.
Official Action for U.S. Appl. No. 29/770,937, dated Mar. 14, 2023, 7 pages.
Notice of Allowance for U.S. Appl. No. 29/770,938, dated Mar. 14, 2023, 7 pages.
Official Action for U.S. Appl. No. 17/589,062, dated Jul. 6, 2023, 20 pages.
Official Action for U.S. Appl. No. 17/589,062, dated Feb. 1, 2024, 20 pages.
Notice of Allowance for U.S. Appl. No. 17/589,062, dated May 8, 2024, 7 pages.

* cited by examiner

ANIMAL TRAINING TABLE

BACKGROUND

The present disclosure relates to training tables for animals.

Tables, platforms, and pedestals can be used for training animals for various purposes. For example, such platforms can be used for training animals for obstacle courses, hunting, police work, border inspections, and/or for coaching animal behavior.

In some more common examples, such platforms can be used for training dogs for a variety of activities. However, training platforms can be used in a variety of other settings, such as lion taming as an example. Many traditional training platforms and tables may not be commercially available for personal animal training uses. Further, many traditional platforms and tables may be constructed for a particular purpose and can commonly be large and/or heavy. Animal trainers, handlers, and/or other users therefore can have little or no freedom to adjust the size and height of such platforms. This can be expensive and inconvenient for trainers that need training platforms for multiple purposes. Additionally, such platforms can be difficult to transport, set up, and/or move.

There is a need for a customizable animal training platform. This can be accomplished through a combination of several design features described below.

DESCRIPTION OF THE SELECTED EMBODIMENTS

Figure 1:
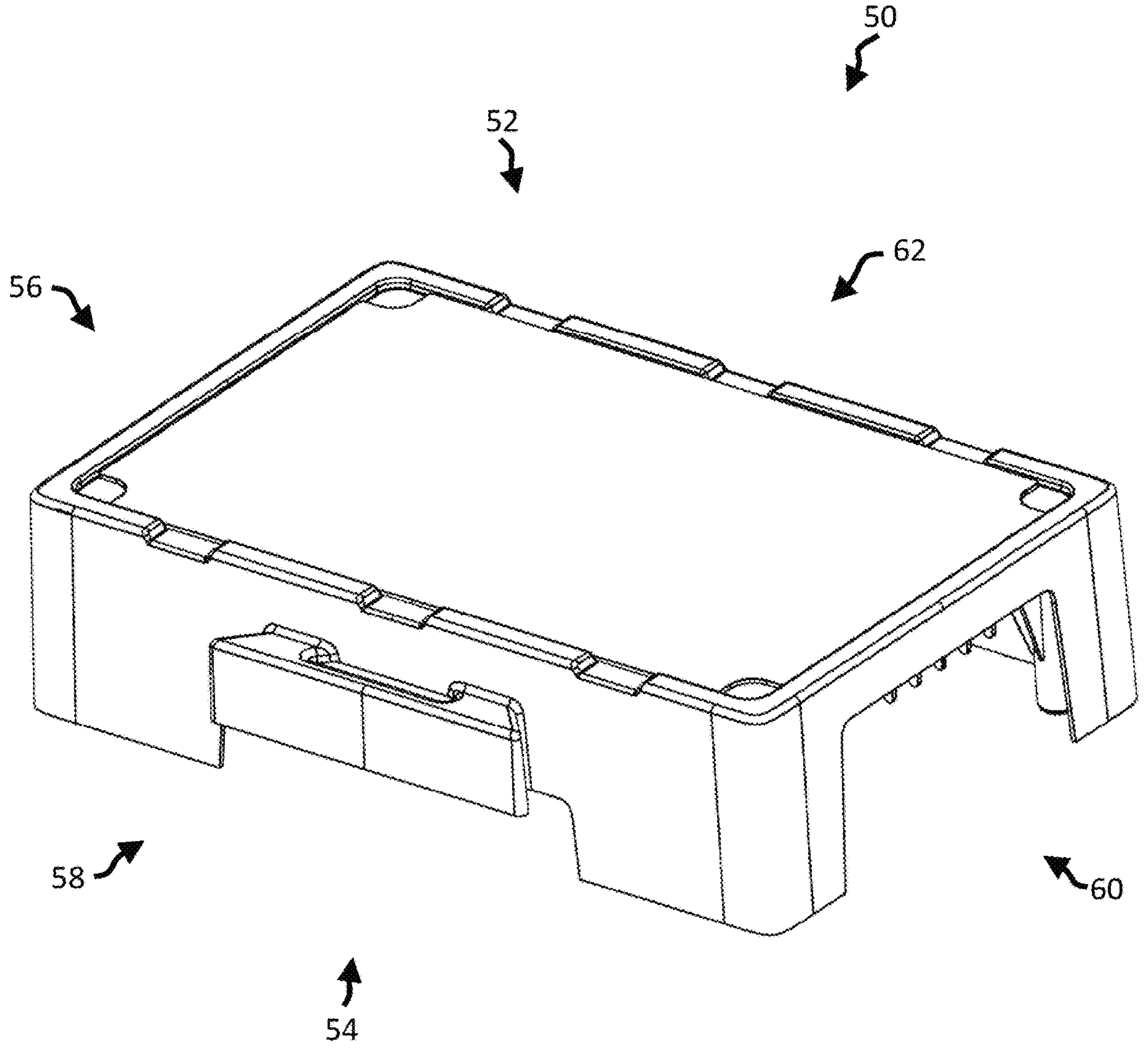
FIG. 1 is a top perspective view of a table according to one example.

For the purpose of promoting an understanding of the principles of the claimed invention, reference will now be made to the embodiments illustrated in the drawings and specific language will be used to describe the same. It will nevertheless be understood that no limitation of the scope of the claimed invention is thereby intended. Any alterations and further modifications in the described embodiments, and any further applications of the principles of the claimed invention as described herein are contemplated as would normally occur to one skilled in the art to which the claimed invention relates. One embodiment of the claimed invention is shown in great detail, although it will be apparent to those skilled in the relevant art that some features that are not relevant to the present claimed invention may not be shown for the sake of clarity.

With respect to the specification and claims, it should be noted that the singular forms "a", "an", "the", and the like include plural referents unless expressly discussed otherwise. As an illustration, references to "a device" or "the device" include one or more of such devices and equivalents thereof. It also should be noted that directional terms, such as "left", "right", "up", "down", "top", "bottom", and the like, are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

Referring to FIG. 1, a table 50 can be used for training animals. For example, table 50 can be used to help the animal perform various exercises and/or learn various commands, such as in preparation for animal performance and/or sport activities. Table 50 can generally be used to teach the animal to say in a confined area which demands focus on the part of the animal. Table 50 provides a natural boundary defining an area in which the animal is to be trained to be confined within. Table 50 can be adapted to support a variety of animals. In one example, the animal can be a dog. In such an example, table 50 can be used for training the dog to race through obstacle courses. In other examples, the animal can be another type of animal trained for performing and/or sport, such as a lion for instance. Table 50 can be tileable and/or stackable to allow animal handlers, trainers, and/or others to construct customized training platform arrangements. Table 50 can further be lightweight, allowing table 50 to be easily transportable and repositionable. For instance, the total weight of table 50 can be less than 20 pounds. Table 50 therefore can provide a strong training surface that is easy to lift, transport, and move.

As shown, table 50 includes a top side 52, a bottom side 54, a left side 56, a front side 58, a right side 60, and a rear side 62. In the illustrated example, table 50 can be rectangular and include four lateral sides 56-62. In an alternate example, table 50 can be another shape that is tileable and have a different number of lateral sides. For example, table 50 could have 6 sides laid out as a hexagon. Table 50 can couple to a similar table on each of lateral sides 56-62. By attaching to multiple tables, table 50 can be used to construct a customized training platform with a different size. For instance, trainers can create gradual inclines for the animal by stacking tables 50 at different heights. The height can be adjusted based on the capabilities of the animal and/or the type of training activity. Further, the width and length of the platform can be customized by laterally coupling multiple tables 50. Adjusting such dimensions can make the platform suitable for different types of activities, for different sizes of animals, and/or for a variety of other training needs. Yet further, table 50 can allow trainers to construct table arrangements with irregular shapes, rather than just square or rectangular platforms, to support fully customized animal training structures. Table 50 therefore provides a high degree of customizability and flexibility compared to traditional types of training platforms.

Figure 2:
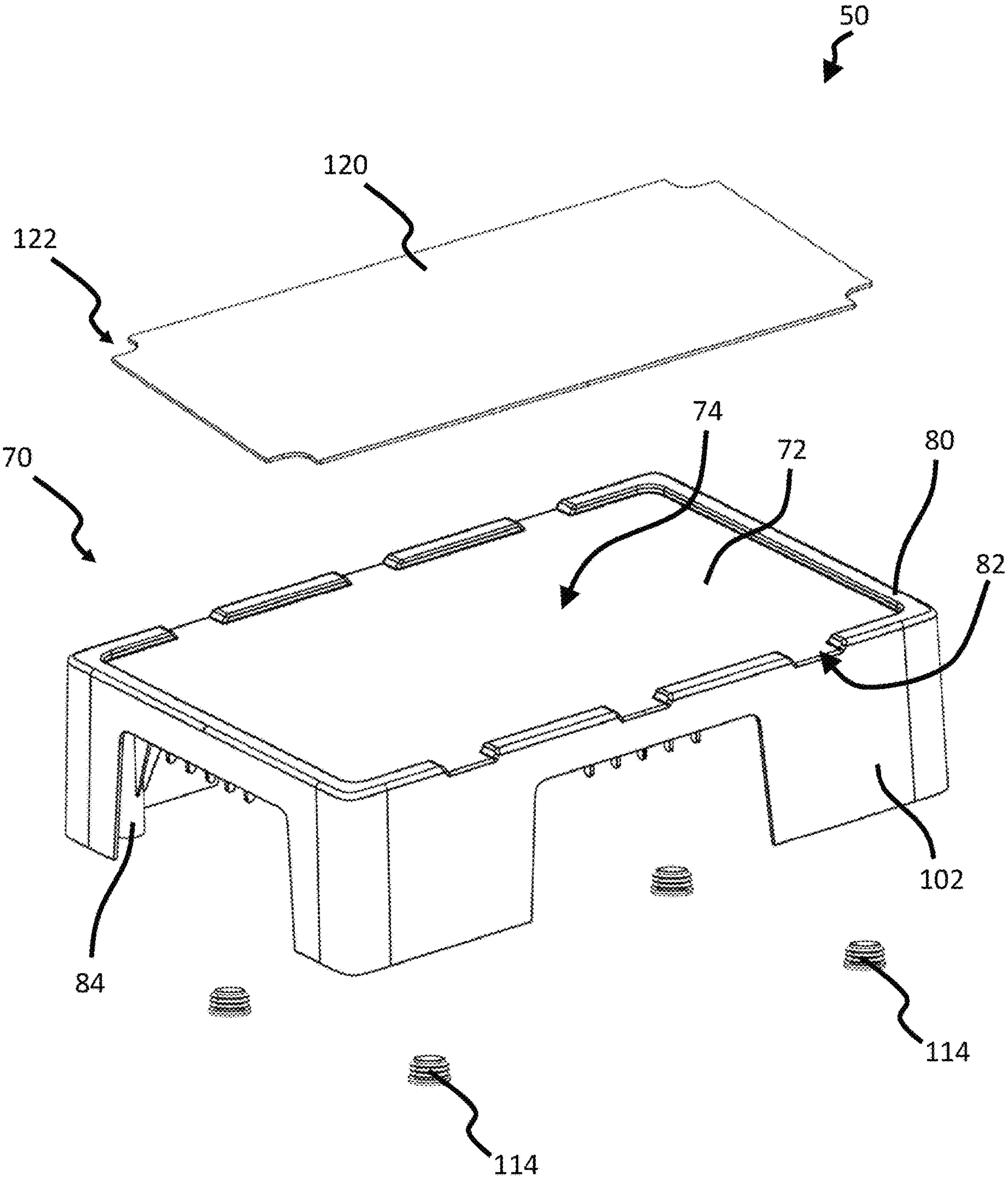
FIG. 2 is an exploded top perspective view of the FIG. 1 table.
Figure 3:
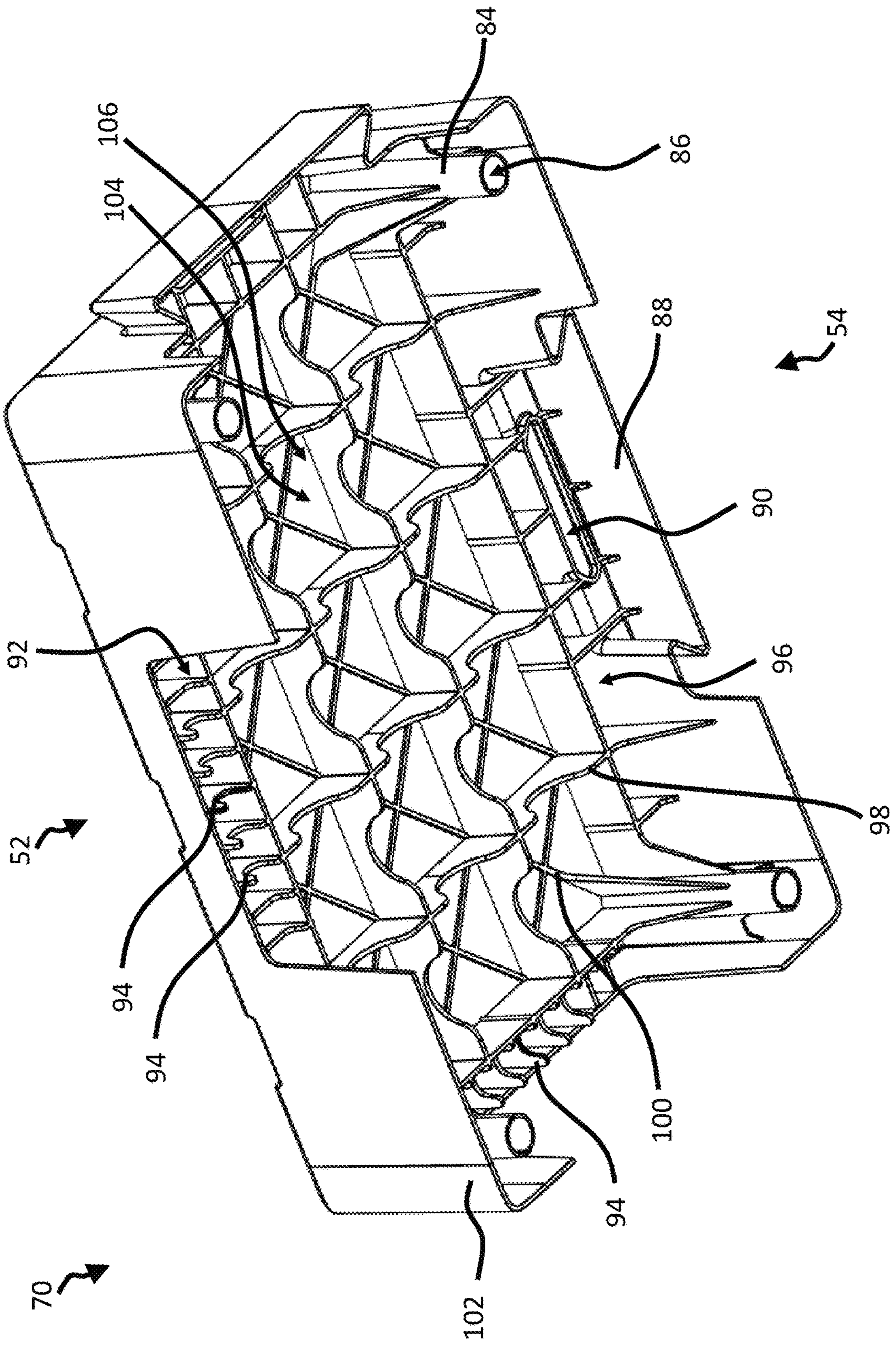
FIG. 3 is a bottom perspective view of a body, a component of the FIG. 1 table.

As shown in FIG. 2, table 50 generally includes a body 70, feet 114, and a pad 120. Body 70 provides the structure of table 50. Body 70 can be made of a rigid material, such as a hard plastic. Body 70 can be formed as a single unitary piece. In one example, body 70 is formed through injection molding. Using injection molding to form body 70 can allow various features of body 70 to be formed reliably and consistently during manufacturing. In another example, body 70 can be formed through another type of molding and/or other type of manufacturing process. Feet 114 can attach to body 70 on bottom side 54. Feet 114 can be made of an elastomeric material that has a higher friction coefficient than body 70. Feet 114 can impede lateral movement of table 50 when table 50 is resting on a surface. Pad 120 can attach to body 70 on top side 52. Pad 120 can have a higher friction coefficient than body 70 to provide improved traction for the animal on pad 120 which may help prevent an animal from slipping on table 50.

Body 70 generally includes a top surface 72 and multiple legs 84. Top surface 72 can support the load of an animal, such as up to 50 pounds, 80 pounds, 100 pounds, 120 pounds, 150 pounds, 200 pounds, and/or another weight. Top surface 72 can be generally flat and uniform to provide a stable area for the animal to step. Top surface 72 can define a central planar region 74 that extends across top surface 72 on top side 54. Central planar region 74 is generally flat and uniform so as to extend consistently along a plane. For instance, central planar region 74 can coincide with a horizontal plane on top side 54. In one example, central planar region 74 extends across all of top surface 72. In another example, central planar region 74 most of top surface 72, such as near the center and not at the corners and/or edges of top surface 72.

Legs 84 extend downwards from top surface 72 toward bottom side 54. Each leg 84 can be positioned at a corner portion of table 50. As noted, top surface 72 and legs 84 can be formed together as a unitary part. Forming legs 84 and top surface 72 together can strengthen table 50 as a whole. Legs 84 can support and elevate top surface 72 above a base surface, such as the ground and/or another table 50. Legs 84 can be hollow to have a low weight and use a relatively small amount of material.

In the illustrated example, body 70 can include a lip 80 that extends around a circumference of body 70. Lip 80 can generally extend above and form a lateral boundary around top surface 72. In the illustrated example, lip 80 can define one or more gaps 82. The gaps 82 can interrupt lip 80 such that lip 80 does not extend contiguously around the circumference of table 50. Gaps 82 can help a trainer and/or handler to drain spilled liquids and/or messes from top surface 72. In one example, gaps 82 can be spaced in even intervals across one or more of lateral sides 56-62 on top surface 72. Further, lip 80 can help strengthen table 50 around the circumference.

As shown, body 70 can further include a skirt 102. Skirt 102 can generally extend around the circumference of table 50 and vertically along lateral sides 56-62. In one example, skirt 102 only partially covers lateral sides 56-62. Skirt 102 can provide additional structural stability while keeping table 50 lightweight. For example, skirt 102 can help table 50 resist bending and/or deforming in other ways without adding significant additional weight. Further, skirt 102 can slope outwards from top side 52 toward bottom side 54. By sloping outward, skirt 102 helps expand body 70 on bottom side 54 to increase the stability of table 50. For instance, the sloped skirt 102 can help table 50 resist tipping.

Pad 120 can attach to body 70 above central planar surface 74. As noted, pad 120 can be made of a higher friction material compared to body 70. In this way, pad 120 can help prevent animals from slipping when standing on table 50. Pad 120 can also provide cushioning for animals on top surface 72. In one example, pad 120 can attach to body 70 without adhesives and/or fasteners. For instance, pad 120 can stay in position after being placed on top surface 72. The friction between pad 120 and top surface 72 can help retain pad 120 in place against top surface 72. Further, lip 80 can impede lateral movement of pad 120 relative to body 70. In another example, pad 120 can couple to body 70 using adhesive, fasteners, and/or in another way. As illustrated, pad 120 can define a chamfer 122 at each corner. Chamfers 122 can allow feet 114 on another table 50 to rest against top surface 72 of body 70 rather than on pad 120. Resting feet 114 against top surface 72 can provide more stability than resting feet 114 on top of pad 120, such as by better resisting slipping, tilting, and/or other movement.

Referring to FIGS. 3 through 9, table 50 can further include projections 88 and recesses 92. Projections 88 and recesses 92 can be shaped to selectively lockingly fit together. Two tables 50 can couple together by selectively locking projection 88 on one table 50 and recess 92 on the other table 50. Table 50 therefore can selectively interlock with one or more other adjacent tables 50. In the illustrated example, projections 88 can be generally trapezoidal in shape with a larger distal width compared to a proximal width. The larger distal width on projection 88 can help projection 88 latch into recess 92 on another table 50. Further, in one example, recess 92 can be shaped to conform around a portion of projection 88. In another example, recess 92 can include an opening in skirt 102. In the illustrated example, projections 88 can extend from adjacent lateral sides 56 and 58. Further, recesses 92 can be defined on adjacent lateral sides 60 and 62 which are positioned oppositely from lateral sides 56 and 58. Each projection 88 can be positioned centrally on respective lateral sides 56, 58. Similarly, each recess 92 can be positioned centrally on respective lateral sides 60, 62.

As noted, table 50 can be tileable to allow users to construct a customized array of multiple tables 50. Arranging projections 88 and recesses 92 on opposing sides can allow a user to selectively couple multiple subsequent tables 50 together to form a customized platform as a series, a grid, and/or another formation. For example, each table 50 can selectively couple to projection 88 and/or recess 92 on a table 50 in the formation to extend the formation in a variety of ways. As should be appreciated, table 50 is not limited to coupling to other identical tables 50. Table 50 can be configured to couple to other types of tables and/or structures that have similar projections to projections 88 and/or similar recesses to recesses 92.

Table 50 can further include locking spars 94. Locking spars 94 extend from body 70 in recesses 92. Locking spars 94 can be generally hook shaped. In the illustrated example, locking spars 94 can be in the form of a series of flat spines that are arranged across a portion of recess 92. In other examples, locking spars 94 can be shaped as a continuous structure and/or in other shapes. Locking spars 94 can help secure projection 88 in recess 90 when two tables 50 selectively couple together.

Locking spars 94 can further interlock with a portion of projection 88 when projection 88 is selectively interlocked in recess 92. As shown, projection 88 can define an opening 90. Opening 90 can receive locking spars 94. Optionally, opening 90 can be shaped to receive fingers of a user so as to allow the user to grip projection 88 as a handle. In one example, a contour of projection 88 near opening 90 can match a contour along a portion of locking spars 94. When locking spars 94 extend into opening 90, locking spars 94 can help further resist or prevent lateral movement of a projection 88 within recess 92.

As illustrated, table 50 can define an interior space 104. Interior space 104 can be defined by top surface 72 and skirt 88. For example, interior space 104 can be bounded by top surface 72 on top side 52, bounded by skirt 88 on lateral sides 56-62, and open on bottom side 54. Skirt 102 can generally enclose legs 84 in interior space 104. Enclosing legs 84 in interior space 104 can help create a generally continuous exterior shape of table 50. For example, skirt 102 can provide a consistent outer profile on table 50 except at projections 88 and recesses 92. Further, using a hollow construction with interior space 104 can allow table 50 to be lightweight. By omitting material on the interior, the overall weight of table 50 can less than 30 pounds, 20 pounds, 10 pounds, and/or another weight. Interior space 104 can define an interior void space 106. Interior void space 106 can be accessible below top surface 72. In one example, interior void space 106 can be used as storage space, such as for toys, treats, and/or other training aids for the animal.

Body 70 can further include a plurality of ribs 96. Ribs 96 can extend from top surface 72 into interior space 104. Ribs 96 can strengthen body 70, particularly across top surface 72. Generally, legs 84 can be designed to support a large weight from directly above, which provides structural support for the portion of top surface 72 directly above legs 84. Ribs 96 can bolster the portion of top surface 72 that spans between legs 84, such as at central planar region 74. For example, ribs 96 can resist flexing and/or other deformation of top surface 72 to generally maintain the flat planar shape of top surface 72. Further, ribs 96 can increase the stiffness of top surface 72. In one example, table 50 can support an animal standing on top surface 72 with weight up to 80 pounds, 100 pounds, 120 pounds, 150 pounds, and/or another weight before exceeding the elastic deformation limit of table 50. Ribs 96 can allow table 50 to utilize a generally hollow and lightweight design while still supporting relatively heavy loads.

In the illustrated example, ribs 96 can be arranged in multiple patterns. For example, ribs 96 can be arranged in a first grid 98 and in a second grid 100. In first grid 98, ribs 96 can extend in rows and columns that are oriented in the directions of lateral sides 56-62. In second grid 100, ribs 96 can extend in rows and columns that are oriented diagonally to the rows and columns of first grid 98. For instance, second grid 100 can provide cross-bracing for first grid 98. In the illustrated example, ribs 96 in first grid 98 can extend further into interior space 104 than ribs 96 in second grid 100. Further, ribs 96 in first grid 98 can utilize a wave shape such that ribs 96 extend further from top surface 72 at the intersection of each row and column than at other points. As should be appreciated, table 50 can utilize a variety of shapes and/or arrangements of ribs 96.

As shown, legs 84 can define holes 86. Holes 86 can receive feet 114. For example, feet 114 can couple to legs 84 through a friction fit and/or a snap-fit connection by inserting into holes 86. Additionally or alternatively, feet 114 can couple to legs 84 through adhesive and/or fasteners. Holes 86 can extend through legs 86 up to top surface 72 such that legs 86 are hollow.

Figure 4:
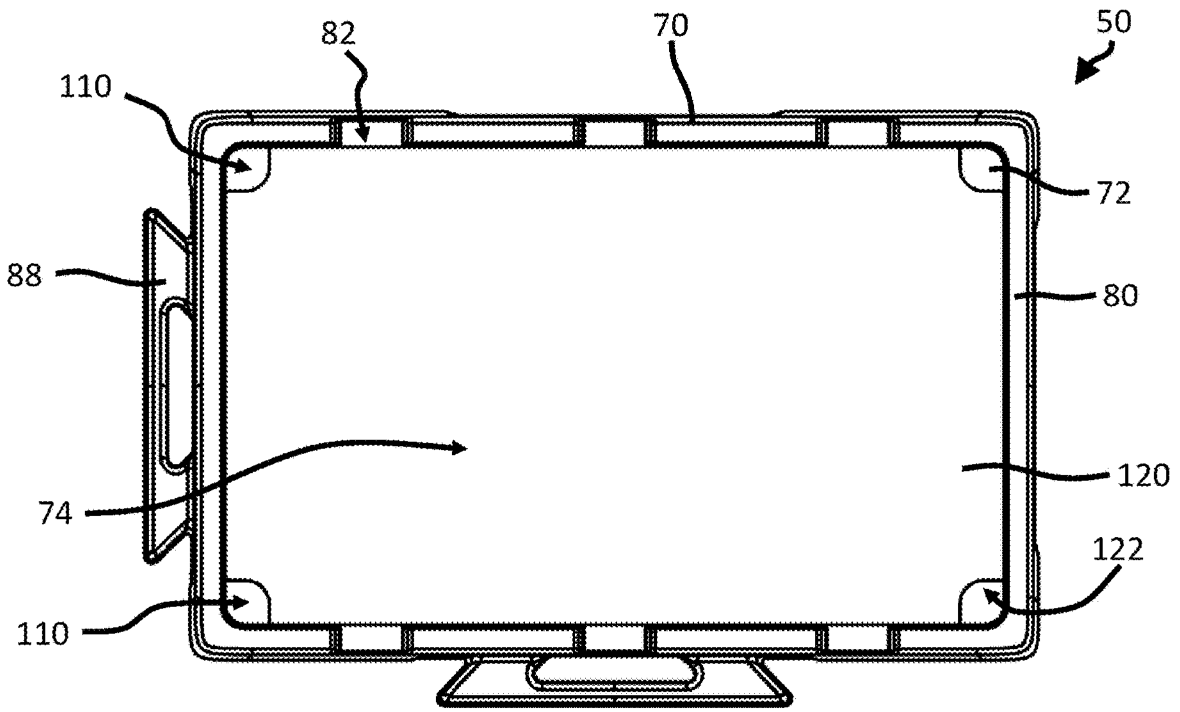
FIG. 4 is a top plan view of the FIG. 1 table.
Figure 5:
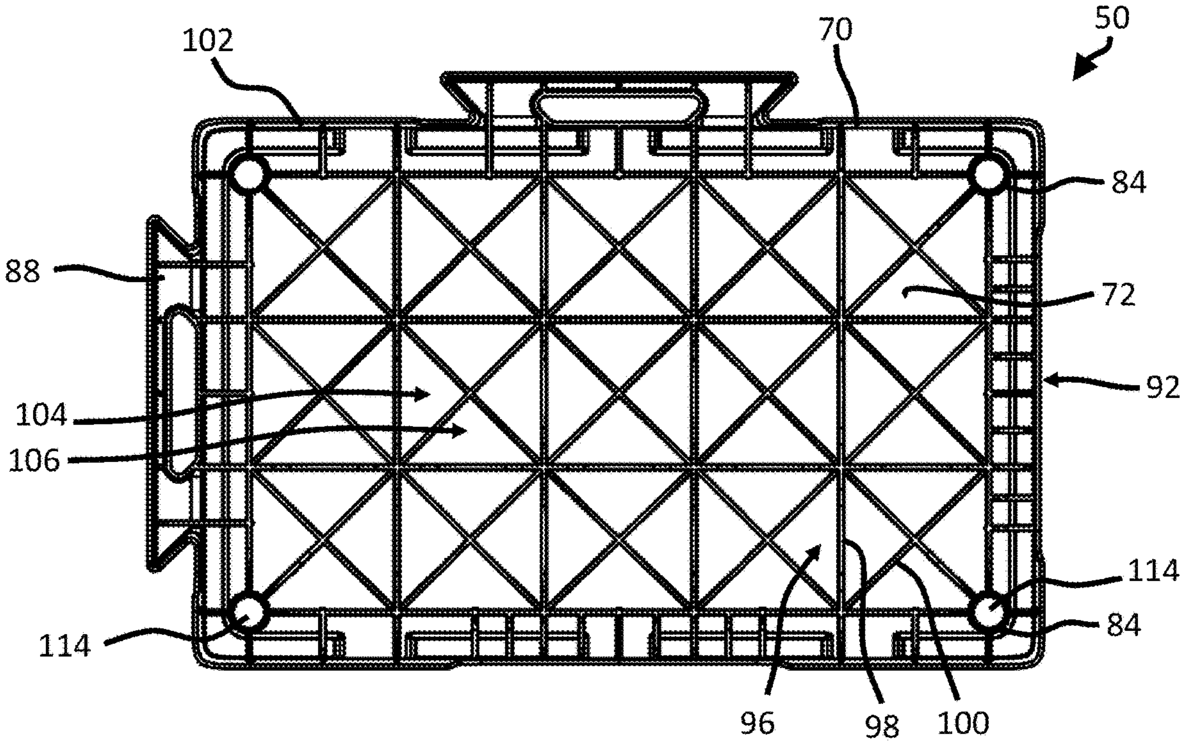
FIG. 5 is a bottom plan view of the FIG. 1 table.
Figure 6:
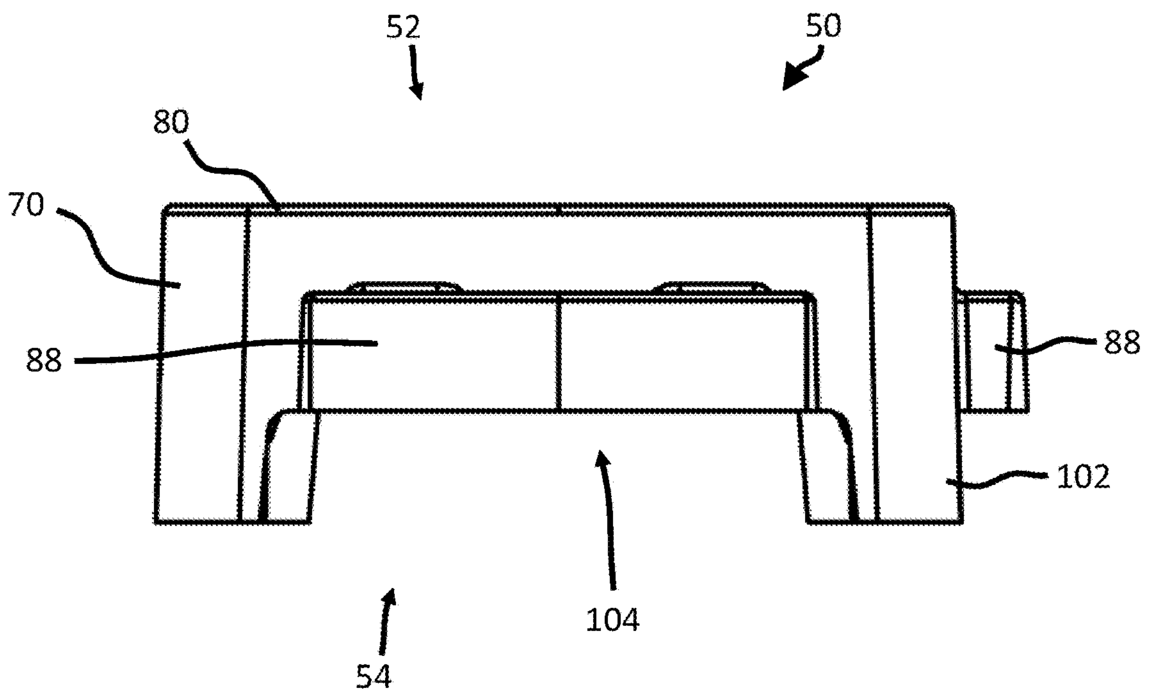
FIG. 6 is a left side elevation view of the FIG. 1 table.
Figure 7:
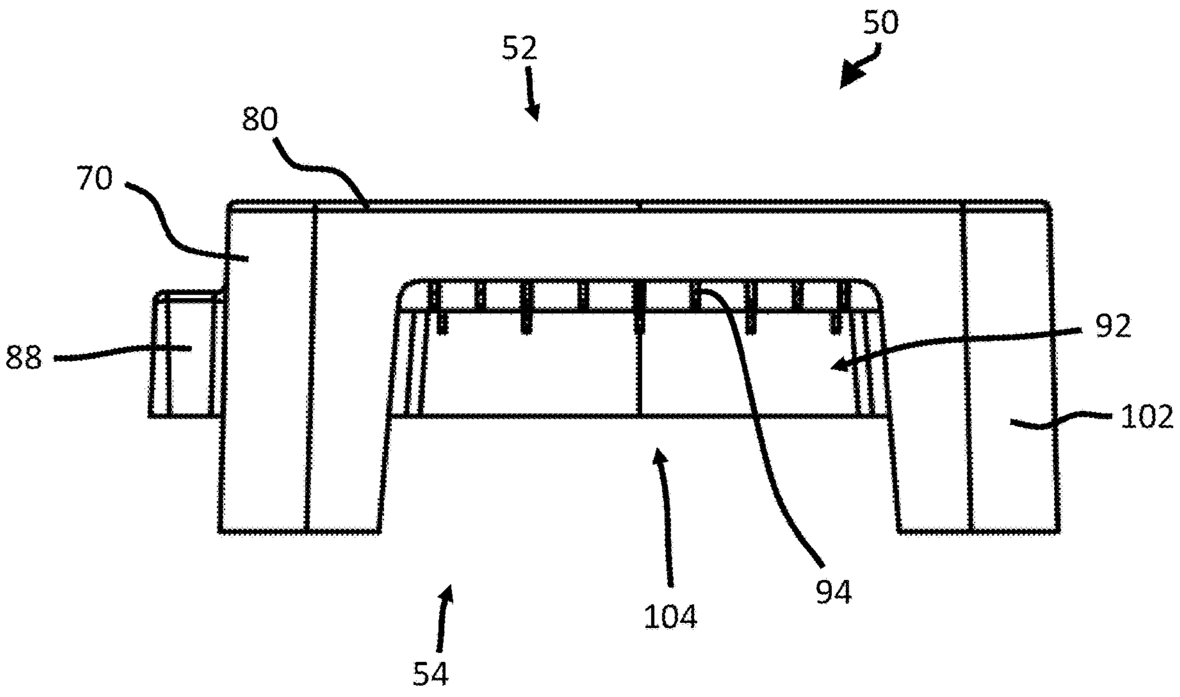
FIG. 7 is a right side elevation view of the FIG. 1 table.
Figure 8:
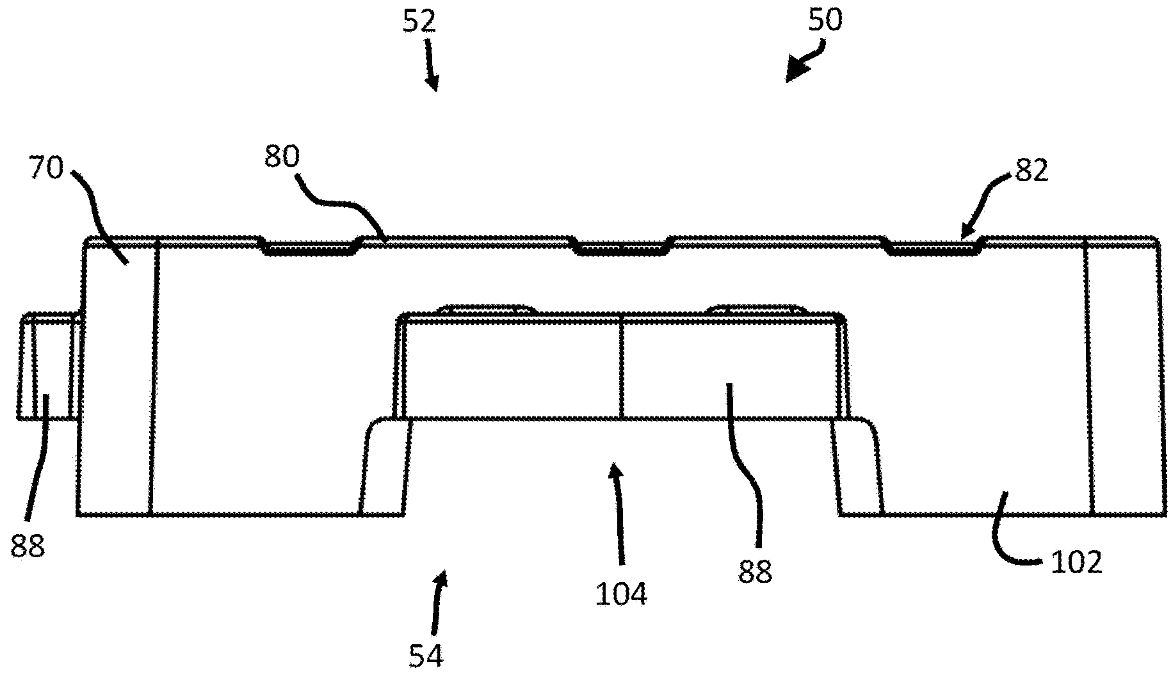
FIG. 8 is a front elevation view of the FIG. 1 table.
Figure 9:
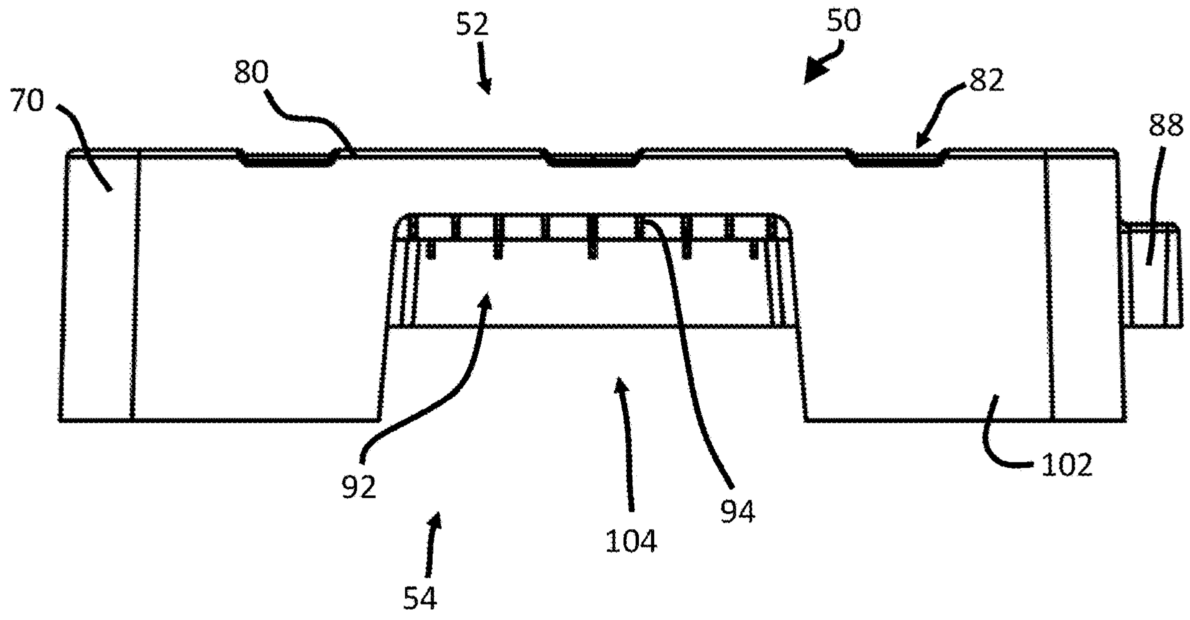
FIG. 9 is a rear elevation view of the FIG. 1 table.

Referring to FIGS. 4 and 5, table 50 can define depressions 110 on top side 52. Depressions 110 can receive feet 114 on another table 50 when stacking tables 50. One depression 110 can be positioned at each corner portion. The positions of depressions 110 can correspond to the position of legs 84 and feet 114. In one example, depressions 110 can be the space on top surface 72 that is not covered by pad 120.

For instance, depressions 110 can be at least partially defined by chamfers 122 on pad 120. In another example, top surface 72 can define depressions 110. For instance, top surface 72 can define depressions 110 that sit below central planar region 74. As should be appreciated, table 50 is not limited to stacking with other identical tables 50. Table 50 can be configured to support and/or stack on top of other types of tables and/or structures that have similar features to top surface 72, depressions 110, and/or feet 114.

Lip 80 can wrap around depressions 110 at the corner portions and can define part of the boundaries of depressions 110. Lip 80 can help secure another table 50 in place on top surface 72, such as by resisting lateral movement of the other table 50. For example, lip 80 can contact legs 84 and/or feet 114 of another table 50 to block lateral movement at the corners. Legs 84 and/or feet 114 can collectively cooperate with lip 80 at all the corners to restrict lateral movement in any direction between two stacked tables 50. Lateral movement of a stacked table 50 will result in at least one leg 84 abutting lip 80. In one example, lip 80 can extend around the corner portions on top surface 72 and not necessarily at other points around the circumference of top surface 72. In another example, lip 80 can be shaped to conform around a portion of leg 84 and/or foot 114 at each corner. Lip 80 can further help resist vertical movement between stacked tables 50 through friction and/or compression between lip 80 and legs 84.

Figure 10:
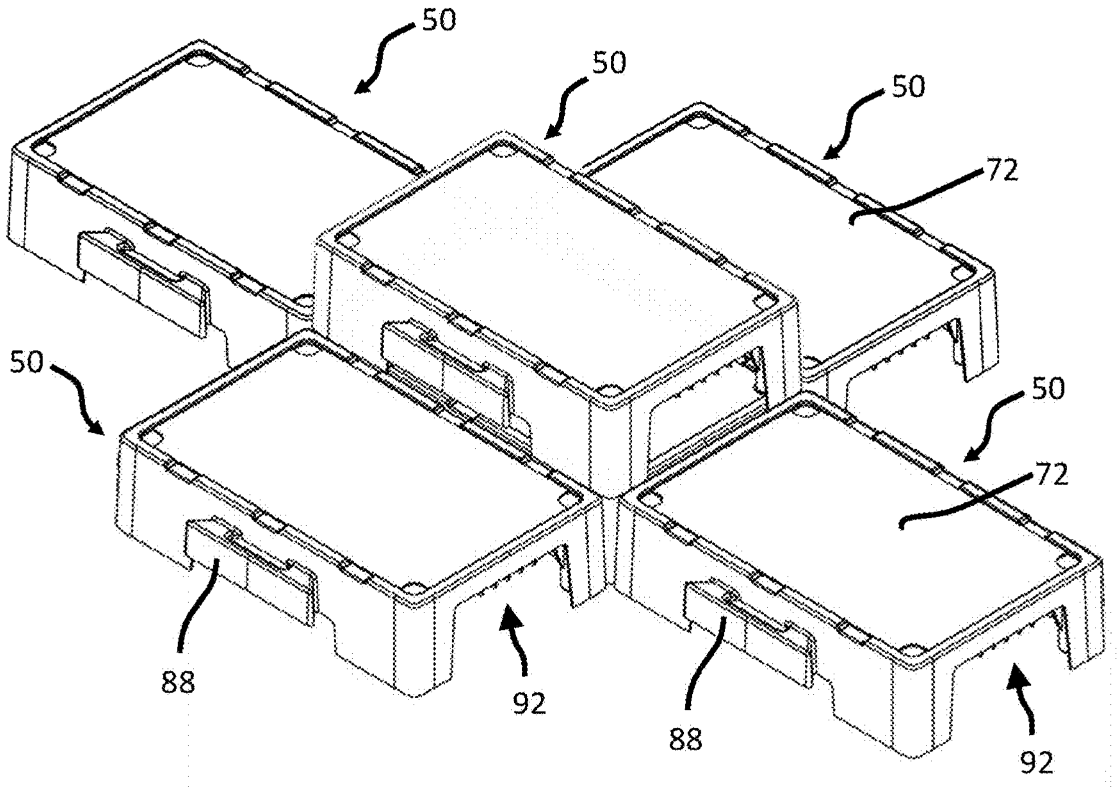
FIG. 10 is a perspective view of an arrangement of a plurality of the FIG. 1 tables coupled together.

FIGS. 10-13 illustrate various views of multiple tables 50 interlocked and/or stacked together in various arrangements. As shown in FIG. 10, one table 50 can couple to up to four other tables 50 on lateral sides 56-62 and can support yet another table 50 stacked on top side 52. Any number of tables 50 can be arranged to form a customized training structure. For example, multiple tables 50 can be stacked in any number of vertical layers. As another example, any number of tables 50 can be coupled laterally to form any two-dimensional array of tables 50 in a vertical layer. As noted, tables 50 can be tileable to create any formation of laterally coupled tables 50. The versatility allows users to create structures that are specialized for training the animal for a particular event, teaching the animal a particular command, performing a particular exercise, physical therapy, and/or for other types of training.

As shown, when multiple tables 50 are interlocked laterally, top surfaces 72 on each table 50 can be at the same height. For example, top surface 72 on each table 50 in a vertical layer can extend through the same plane. Therefore, the overall top surface across each vertical layer of tables 50 is generally consistent across all of the individual top surfaces 72. The consistent layering of tables 50 can ensure that the overall structure remains stable during training activities. Further, the consistent surfaces across each layer can help prevent injuries and/or other accidents to the animal during training.

Figure 11:
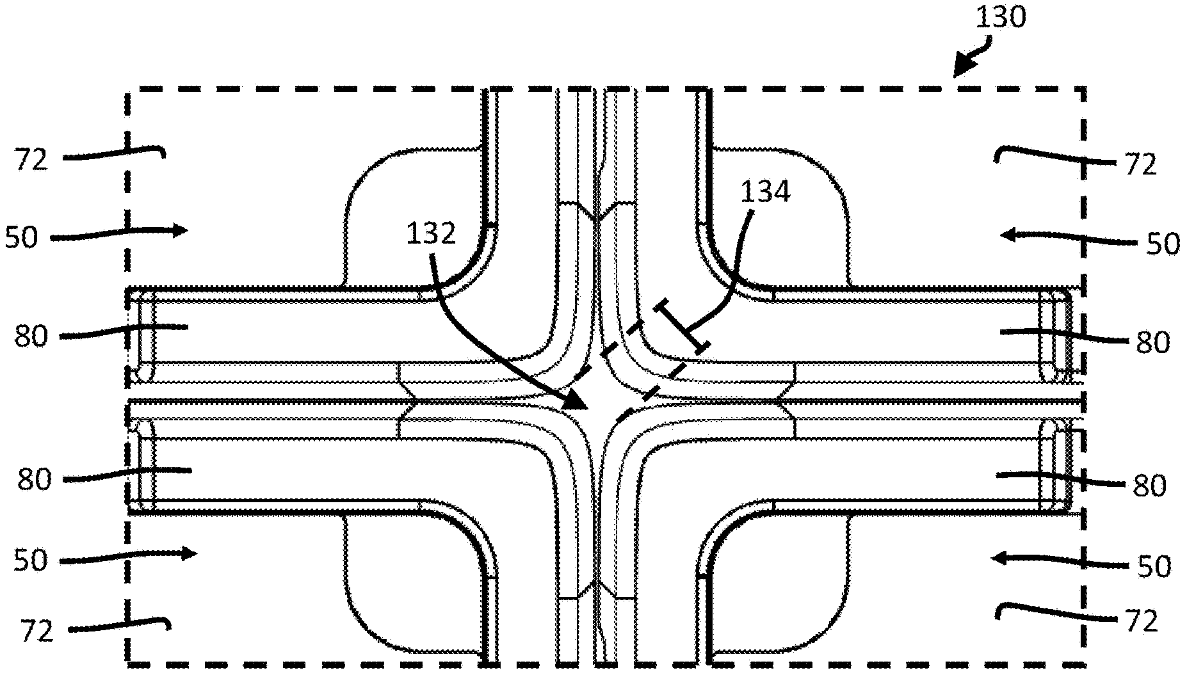
FIG. 11 is an enlarged top plan view of four of the FIG. 1 tables arranged in a 2-by-2 array.

Referring to FIG. 11, table 50 can be designed to fit tightly against other tables 50 to minimize the space between multiple tables 50. Particularly, table 50 can have sufficiently square corners such that the space at the junction of the corners of four tables 50 is minimized. In the FIG. 11 example, four tables 50 can be arranged in a 2-by-2 array 130. Tables 50 can define a junction space 132 between the corners of four tables 50. Tables 50 can define a width 134 across junction space 132 between the corners. Width 134 is defined in a horizontal plane that is parallel with top surfaces 72 on each of tables 50 in the array 130. Width 134 can be the maximum width between corners within the plane. In other words, width 134 can be an upper limit on the largest dimensional measurement on an object that can fit into junction space 132. For instance, for objects with circular or rectangular cross-sectional shapes, width 134 can represent the maximum diameter or width of that object that can pass into junction space 132. In one example, width 132 can be less than one third inch, one half inch, two thirds inch, three quarters inch, one inch, and/or another distance. Having a small width 132 can help form a cohesive top surface across multiple tables 50 and can ensure that the animal does not accidentally step into or get caught on the corners at junction space 132.

Figure 12:
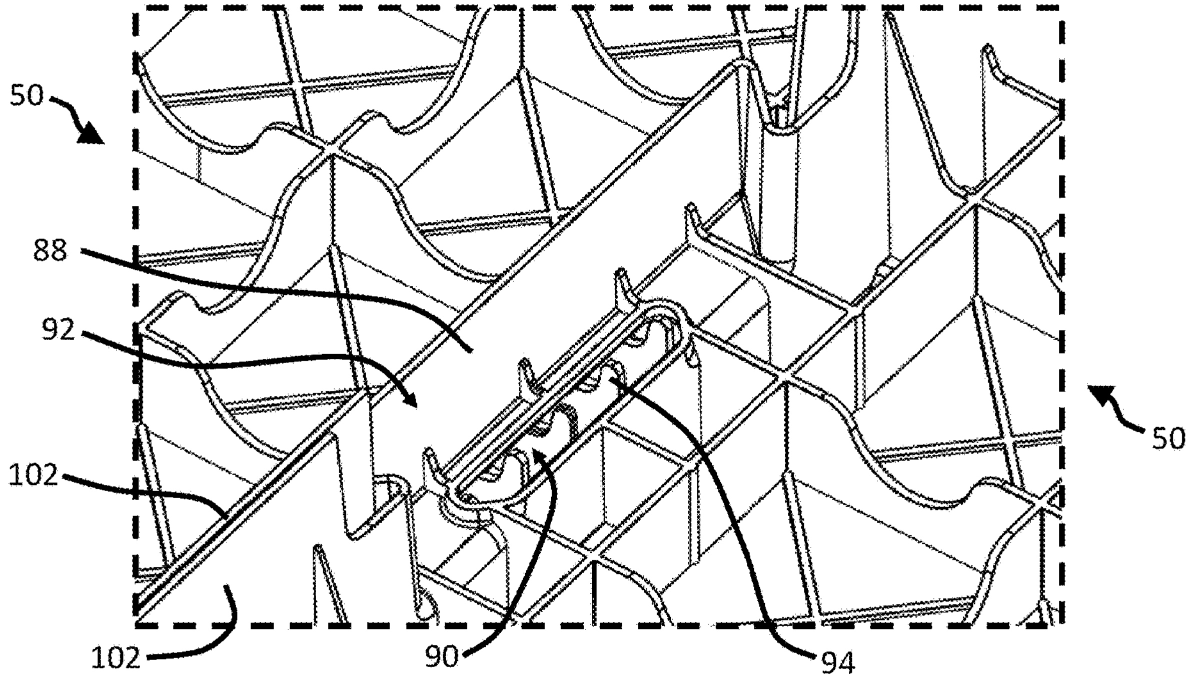
FIG. 12 is an enlarged bottom perspective view of two of the FIG. 1 tables laterally interlocked together.

FIG. 12 illustrates an enlarged view of two tables 50 coupled together laterally through projection 88 and recess 92. In the illustrated example, recess 92 can open out to bottom side 54. One table 50 can be vertically lowered onto the other table 50 such that recess 92 lowers onto projection 88. Once projection 88 is positioned in recess 92, projection 88 can lock the two tables 50 together laterally. As noted, the generally trapezoidal shape of projection 88 can help projection 88 latch into recess 92. For instance, the narrower portion of projection can sit between portions of skirt 102 and the wider portion of projection 88 can lock projection 88 against skirt 102. In one example, the edges of skirt 102 at recess 88 can be sloped so as to wedge projection 88 between the edges of skirt 102 when recess 88 is lowered onto projection 88. In another example skirts 102 can be sloped outward so as to wedge projection against the interior of skirt 102 when recess 88 is lowered onto projection 88. In this way, skirt 102 on each table 50 can cooperate with projection 88 and recess 92 to help interlock adjacent tables 50.

As shown, locking spars 94 can extend into opening 90 on projection 88 when projection 88 is positioned in recess 92. In one example, locking spars 94 can abut projection 88 on the edges of opening 90. For example, two locking spars 94 can abut projection 88 on opposing ends of opening 90 so as to resist movement of projection 88 in a direction along the face of the lateral side. In another example, each locking spar 94 can abut projection 88 on one or more edges of opening 90 so as to resists movement of projection 88 in a direction away from the face of the lateral side. Further, locking spars 94 can cooperate with skirt 102 on each table 50 to restrict relative movement of table 50. For instance, contact between skirts 102 and contact between locking spars 94 and projection 88 can help restrict movement between the two tables 50 in one or more lateral directions.

Figure 13:
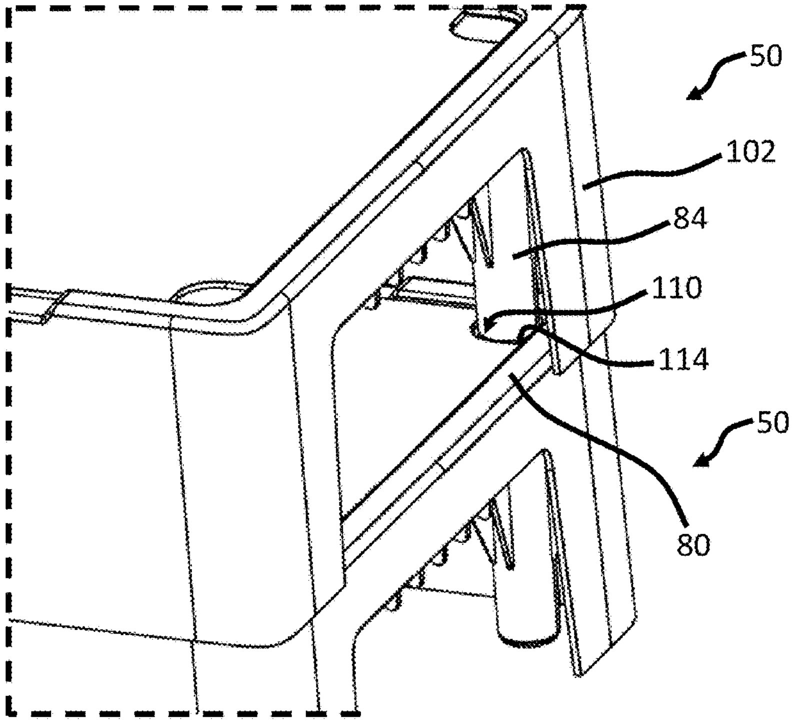
FIG. 13 is an enlarged side perspective view of two of the FIG. 1 tables stacked together.

FIG. 13 illustrates an enlarged view of two tables 50 stacked together. As shown, feet 114 on one table 50 can rest in depressions 110 on the other table 50. Lip 80 can contact feet 114 at the corners to help restrict lateral movement between the two tables 50. Further, skirt 102 can extend around lip 80. For example, one table 50 can receive lip 80 of the other table 50 between feet 114 and skirt 102. Lip 80 and skirt 102 can further help restrict lateral movement between the two tables 50. In one example, friction and/or compression between skirt 102 and lip 80 can resist vertical movement between the two tables 50. Such a stacking arrangement can ensure that each table 50 can sit securely on a table 50 below and can stably support a table 50 above.

Figure 14:
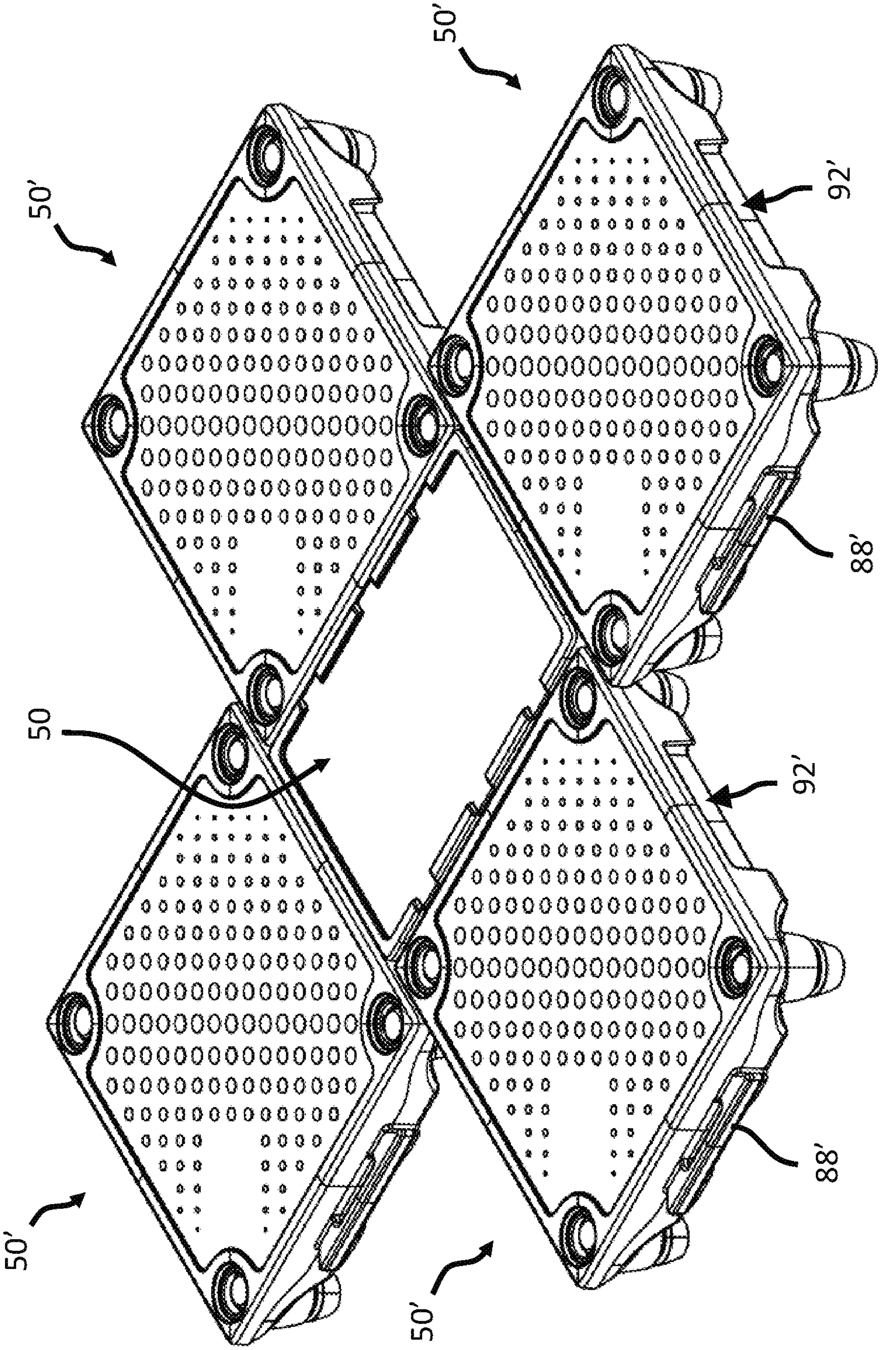
FIG. 14 is a perspective view of an arrangement including the FIG. 1 table and a prior art version of the table according to one example.

Referring to FIG. 14, table 50 can interlock with tables that are not necessarily identical to table 50. As shown, table 50 can interlock with one or more alternative tables 50'. In one example, table 50' can be in the form of the table described in U.S. Pat. No. 9,282,819. Table 50' can have some similar features as described in previous figures for table 50. For instance, table 50' can include projections 88' and/or recesses 92'. However, table 50' can have a different shape, different construction, and/or other different characteristics compared to table 50. For instance, table 50' can be square while table 50 is rectangular with differing side lengths. Using tables 50 and 50' together can provide additional customization to users to build training structures for animals. As some examples, the combination of different types of tables 50 can allow users to customize the overall shape of the structure in different ways, utilize different types of surface materials on different parts of the structure, and/or utilize different strength materials at different areas. By interfacing with table 50' and/or other types of tables, table 50 can be used as a versatile component for arranging customized animal training structures.

While the present disclosure has been illustrated and described in detail in the drawings and foregoing description, the same is to be considered as illustrative and not restrictive in character, it being understood that a preferred embodiment has been shown and described and that all changes, equivalents, and modifications that come within the spirit of the claimed invention defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The language used in the claims and the written description and in the above definitions is to only have its plain and ordinary meaning, except for terms explicitly defined above. Such plain and ordinary meaning is defined here as inclusive of all consistent dictionary definitions from the most recently published (on the filing date of this document) general purpose Merriam-Webster dictionary.

The invention claimed is:

1. A four-sided table adapted for use as an animal training aid, the table comprising:

a top surface adapted to support the animal standing on the top surface;

four legs extending below the top surface at corner portions of the top surface, wherein the top surface defines four depressions adapted to receive the four legs of another table so that the table is suitable for stacking with like tables, wherein the four legs are unitarily formed as a single piece with the top surface;

projections extending from each of two adjacent sides of the table and corresponding recesses defined in each of the two other sides of the table, each projection shaped to selectively lockingly fit in recesses like the recess on the opposite side of the table so that the table is suitable for selective interlocking with adjacent like tables with adjacent top surfaces at the same height;

a skirt that extends below a perimeter of the top surface and which encloses the four legs within an interior space defined by the top surface and the skirt, wherein the recesses are adapted to receive projections on adjacent like tables by vertically lowering the recesses over the projection on the adjacent like table, and wherein the skirt slopes downward and outward from the top surface.

2. The table of claim 1, wherein the interior space defined by the top surface and the skirt defines an interior void space accessible from below the top surface.

3. The table of claim 1, wherein the projections and recesses are centrally positioned on the respective sides of the table on which they each lie.

4. The table of claim 1, wherein the top surface defines a central planar region that is flat.

5. The table of claim 4, further comprising a pad that is attached above the central planar region, wherein the pad has a larger coefficient of friction than the table.

6. The table of claim 4, further comprising a lip that extends above the top surface around at least a portion of a perimeter of the top surface.

7. The table of claim 6, wherein the lip is not contiguous around a circumference perimeter of the top surface and defines a plurality of gaps that omit the lip.

8. The table of claim 6, wherein the lip extends partially around each of the four depressions such that the lip resists lateral movement of stacked like tables.

9. The table of claim 8, further comprising an elastomeric foot coupled to a bottom side of each of the legs to impede lateral movement of the table when the table is placed on a surface.

10. The table of claim 1, wherein the table weighs less than 20 pounds.

11. The table of claim 1, wherein the table can support an animal weighing one hundred pounds standing on the top surface without the table exceeding its elastic deformation limit.

12. The table of claim 1, wherein the table is formed using injection molding.

13. The table of claim 1, further comprising a plurality of ribs extending below the top surface.

14. The table of claim 13, further comprising a plurality of locking spars configured to individually interlock with different portions of a selectively interlocked projection.

15. The table of claim 1, wherein the table has sufficiently square corners that when four like tables are positioned in a 2-by-2 array, any space defined at a central junction of all four tables has a width less than one half inch at any angle on a horizontal plane that is parallel to the top surface.

16. A four-sided table adapted for use as an animal training aid, the table comprising:

a top surface adapted to support the animal standing on the top surface, wherein the top surface defines a central planar region that is flat;

four legs extending below the top surface at corner portions of the top surface, wherein the top surface defines four depressions adapted to receive the four legs of another table so that the table is suitable for stacking with like tables, wherein the four legs are unitarily formed as a single piece with the top surface;

projections extending from each of two adjacent sides of the table and corresponding recesses defined in each of the two other sides of the table, each projection shaped to selectively lockingly fit in recesses like the recess on the opposite side of the table so that the table is suitable for selective interlocking with adjacent like tables with adjacent top surfaces at the same height, wherein the recesses are adapted to receive projections on adjacent like tables by vertically lowering the recesses over the projection on the adjacent like table; and a lip that extends above the top surface around at least a portion of a perimeter of the top surface, wherein the lip is not contiguous around the perimeter of the top surface and defines a plurality of gaps that omit the lip.

17. The table of claim 16, further comprising a skirt that extends below a circumference of the top surface and which encloses the four legs within an interior space defined by the top surface and the skirt.

18. The table of claim 17, wherein the skirt slopes downward and outward from the top surface.

19. The table of claim 16, further comprising at least one of:

a pad that is attached above the central planar region, wherein the pad has a larger coefficient of friction than the table; and an elastomeric foot coupled to a bottom side of each of the legs, wherein the elastomeric foot impedes lateral movement of the table when placed on a surface.

20. The table of claim 16, wherein the lip extends partially around each of the four depressions such that the lip resists lateral movement of stacked like tables.

* * * * *